United States Patent [19]
Takahashi et al.

[11] Patent Number: 5,621,835
[45] Date of Patent: Apr. 15, 1997

[54] OPTICAL FIBER ASSEMBLY AND MANUFACTURING METHOD FOR THE SAME

[75] Inventors: Mitsuo Takahashi; Kunio Yamada, both of Matsudo, Japan

[73] Assignee: Seikoh Giken Co., Ltd., Matsudo, Japan

[21] Appl. No.: 512,411

[22] Filed: Aug. 8, 1995

Related U.S. Application Data

[63] Continuation-in-part of Ser. No. 314,253, Sep. 29, 1994, abandoned.

[30] Foreign Application Priority Data

May 20, 1994 [JP] Japan ................................. 6-129922
Mar. 31, 1995 [JP] Japan ................................. 7-100670

[51] Int. Cl.[6] ................................................. G02B 6/36
[52] U.S. Cl. ................... 385/78; 385/76; 385/77; 385/81; 385/80; 385/87; 385/139
[58] Field of Search ................... 385/76, 77, 78, 385/80, 84, 85, 81, 86, 87, 139

[56] References Cited

U.S. PATENT DOCUMENTS

| | | | |
|---|---|---|---|
| 4,440,469 | 4/1984 | Schumacher | 385/76 X |
| 4,743,084 | 5/1988 | Manning | 385/76 |
| 5,013,122 | 5/1991 | Savitsky et al. | 385/76 X |
| 5,054,879 | 10/1991 | Brown | 385/59 |
| 5,058,984 | 10/1991 | Bulman et al. | 385/80 |
| 5,166,996 | 11/1992 | McCoy | 385/84 |
| 5,241,613 | 8/1993 | Li et al. | 385/78 |
| 5,363,461 | 11/1994 | Bergmann | 385/78 |

Primary Examiner—Brian Healy
Attorney, Agent, or Firm—Spencer & Frank

[57] ABSTRACT

An optical fiber assembly which can be used without deterioration in the performance thereof even when it is used under a severe environmental condition wherein temperature frequently changes over a wide temperature range. The structure of an optical fiber assembly in accordance with the invention may be applied to an optical fiber connector plug and the like. The optical fiber connector plug is constituted by an optical fiber having an end with a protective sheath thereof removed, a ferrule of a support for fixing of the optical fiber, a thin-wall metal pipe which receives the protective sheath on the optical fiber and fixes it by crimping a plurality of places thereof, and a metal supporting sleeve with a flange which is provided as an integral part of the ferrule and which supports the thin-wall metal pipe. The optical fiber and the thin-wall metal pipe are fixed to the ferrule and the metal supporting sleeve, respectively, at the same time by gluing with thermosetting resin. The physical properties such as the hardness of the protective sheath of the optical fiber assembly change in a reversible manner between the upper and lower extremes of the environment wherein the optical fiber assembly is used; however, the problem of slipping out (pistoning) observed in a conventional optical fiber assembly is reliably prevented.

6 Claims, 3 Drawing Sheets

OPTICAL FIBER ASSEMBLY AND MANUFACTURING METHOD FOR THE SAME

CROSS REFERENCE TO A RELATED APPLICATION

This application is a continuation in part of a application Ser. No. 08/314,253 filed Sep. 29, 1994, now abandoned.

BACKGROUND OF THE INVENTION

1. Field of the Invention

The present invention relates to an optical fiber assembly such as an optical fiber connector plug and, more particularly, to an optical fiber assembly which is expected to be used under a severe environmental condition wherein temperature frequently changes over a wide range with high and low extreme temperatures.

2. Description of the Related Art

An optical fiber assembly is often used under a severe environmental condition wherein temperature frequently changes greatly between high and low extremes. The following describes problems found in such an optical fiber assembly.

FIG. 7 is a cross-sectional view showing a conventional optical fiber connector plug; FIG. 8 is a cross-sectional view illustrating an optical fiber connector plug which has been broken during a heating cycle test. A zirconia ceramic ferrule is extensively used for a ferrule 3 which has a through hole for receiving an optical fiber 2 at the center of the ferrule 3. A metallic supporting sleeve 4 made of stainless steel has a flange, a stepped hole 6 for receiving the base of the ferrule 3, and a hole for receiving an optical fiber protective sheath 1.

The optical fiber protective sheath 1 employs UV resin or PVC resin. The optical fiber 2 is fixed in a hole 5 of the ferrule 3 with an epoxy resin adhesive agent 17a; the optical fiber protective sheath 1 is glued and fixed on the metallic supporting sleeve 4 with epoxy resin adhesive agents 17b, 17c.

Various tests are conducted, expecting that the optical fiber assembly will be used in a severe environment. The upper limit of the temperature range which an optical connector is required to survive during heating cycle test is +80° C. and the lower limit is −40° C. During the heating cycle test, the temperature is increased from 25° C. to the upper limit, namely, +80° C. in 30 minutes, then the upper limit temperature is maintained for 30 minutes; the temperature is then decreased back to 25° C. in 30 minutes, and the 25° C. temperature is maintained for 30 minutes before it is decreased to the lower limit, namely, −40° C., in 30 minutes; then the −40° C. temperature is maintained for 30 minutes before it is increased back to 25° C. in 30 minutes and the 25° C. temperature is maintained for 30 minutes. This cycle is repeated. The number of repetitions ranges from 10 to 1000 cycles although it depends on the request of each user. In the heating cycle test, the optical characteristics of the optical connector are required to stay within specified values.

The heating cycle test is one of the extremely exacting tests for a device with an optical fiber; there has been a problem in that an optical fiber breaks during a heating cycle test which consists of many repeated cycles of 100 or more.

Specifically, as shown in FIG. 8, it often happens that the optical fiber 2 breaks at point B and the optical fiber sheath 1 moves out in the direction of the arrow from the stepped hole 6 of the supporting sleeve 4.

The problem is considered attributable mainly to the difference in expansion from the difference in the linear expansion coefficient based on the different materials used for the metallic supporting sleeve 4 and the optical fiber protective sheath 1, the transition of the epoxy resin adhesive agent into hard glass due to curing, the change which takes place in the hardness of the protective sheath made of hard-to-stick PVC resin, and unsuccessful adhesion to the protective sheath 1 which has a smooth surface. When stainless steel is used for the metallic supporting sleeve 4, the linear expansion coefficient, which constitutes a factor for the shift in the axial direction, will be approximately $12 \times 10^{-6}/°C$. In the case of a single-mode (SM) optical fiber core with a quartz (Si) type clad, the linear expansion coefficient is $12 \times 10^{-6}/°C$. which is practically similar to the one obtained with the stainless steel. Using the PVC resin, however, for the optical fiber protective sheath 1 causes a linear expansion coefficient, which constitutes a factor for the shift in the axial direction, to be $50 \times 10^{-6}/°C$., indicating a significant difference between the core and the stainless steel.

If an adhesion length L of the protective sheath 1 is 5 mm and the difference in temperature during the heating cycle test is 120° C., then the expansion of the protective sheath 1 will be 30 μm in relation to the axial expansion 7 μm of the metallic supporting sleeve 4, the difference in expansion being approximately 23 μm. Hence the protective sheath 1, which is incompletely glued at high temperature, extends out of the supporting sleeve 4 by the length which corresponds to the difference in expansion between the protective sheath 1 and the flange. It is considered that the protective sheath 1 moves to the right in FIG. 7 and FIG. 8 because it is difficult for it to move toward the ferrule.

On the contrary, the protective sheath 1 shrinks at low temperature; however, it does not go back to home position thereof. This is considered because the PVC resin hardens at the extremely low temperature, namely, −40° C. and the frictional force or the like produced between the protective sheath 1 and the surface of the ferrule hole prevents the protective sheath 1 from going back to the home position thereof.

Thus, the PVC resin protective sheath 1 comes out in a very small amount by the difference in expansion for each cycle.

Hence, it is presumed that tensile stress in the axial direction is accumulated in the optical fiber 2 for each cycle until the optical fiber 2 finally breaks. FIG. 8 shows the optical fiber 2 which has broken with the protective sheath 1 drawn together with the adhesive agent 17c out of the hole of the supporting sleeve 4. The phenomenon where a part of the optical fiber slips out is called "pistoning phenomenon."

The breakage of the optical fiber stated above is a critical shortcoming of an optical fiber assembly. Repeated application of excessive stress to a part of the optical fiber can cause deterioration in the optical characteristics of the optical fiber even if the optical fiber does not break.

SUMMARY OF THE INVENTION

Accordingly, it is an object of the present invention to provide an optical fiber assembly which is capable of solving the problem such as the breakage of the optical fiber in the above-mentioned optical fiber assembly which is expected to be used under a severe environmental condition wherein temperature frequently changes over a wide range with high and low extremes.

It is another object of the present invention to provide a manufacturing method for an optical fiber assembly, whereby an optical fiber assembly, which is expected to be used under a severe environmental condition wherein temperature frequently changes over a wide range with high and low extremes, can be manufactured quickly by an easy manufacturing process.

To these ends, according to one aspect of the present invention, there is provided an optical fiber assembly comprising: an optical fiber which has a distal end with a protective sheath removed; a ferrule for fixing the optical fiber; a thin-wall metal pipe wherein the protective sheath of the optical fiber is placed and fixed by crimping; and a supporting sleeve which is provided as an integral part of the ferrule and which receives the aforesaid thin-wall metal pipe; the optical fiber and the metal pipe being fixed to the ferrule and the supporting sleeve by gluing with thermosetting resin.

The distal end of the metal pipe or the sheath of the optical fiber assembly is butted against and fixed to the ferrule.

The optical fiber assembly is an optical fiber connector plug and the ferrule is made of ceramic. The supporting sleeve may be a metal sleeve.

To the aforesaid ends, according to another aspect of the present invention, there is provided an optical fiber assembly comprising: an optical fiber which has a distal end with a protective sheath removed; a ferrule for fixing the optical fiber; a thin-wall metal pipe which receives the protective sheath of the optical fiber and which is fixed by letting a plurality of points thereof, which are symmetrical to the optical axis of the optical fiber, bite into the sheath of the optical fiber and then crimping them; and a supporting sleeve which is provided as an integral part of the ferrule and which accepts the aforesaid thin-wall metal pipe; the optical fiber and the metal pipe being fixed onto the ferrule and the supporting sleeve by gluing with thermosetting resin.

To accomplish the second object stated above, according to the present invention, there is provided a manufacturing method for an optical fiber assembly comprising: a step for fixing the ferrule and the ferrule supporting sleeve; a step for introducing the sheath of the optical fiber with the end of the optical fiber exposed into the thin-wall metal pipe and fixing the metal pipe by letting a plurality of spots thereof bite into the sheath then crimping them; a step for filling the base of the ferrule with a thermosetting adhesive agent and inserting the optical fiber into the ferrule and the metal pipe into the supporting sleeve to form an assembly; and a step for heating the assembly to fix the optical fiber to the ferrule and the metal pipe to the supporting sleeve with an adhesive agent.

DESCRIPTION OF THE PREFERRED EMBODIMENTS

The optical fiber assembly in accordance with the present invention will now be described in detail with reference mainly to the accompanying drawings.

Figure 1:
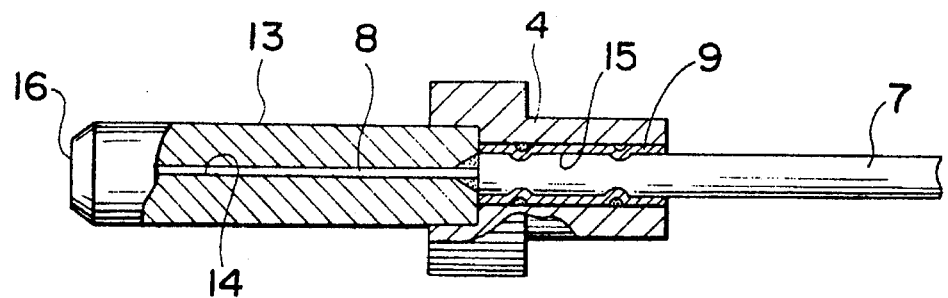
FIG. 1 is a diagram showing an embodiment of an optical fiber assembly in accordance with the present invention, the assembly being partially cut away.
Figure 2:
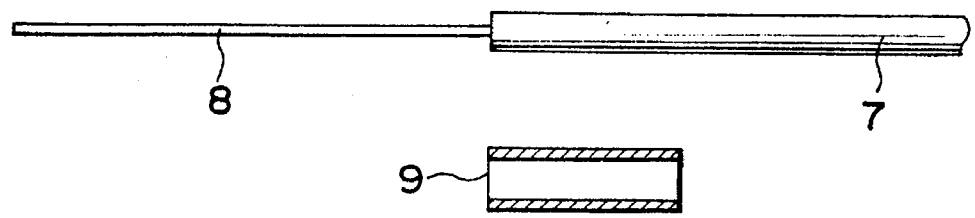
FIG. 2 is a schematic diagram showing components used in the aforesaid embodiment.
Figure 3:
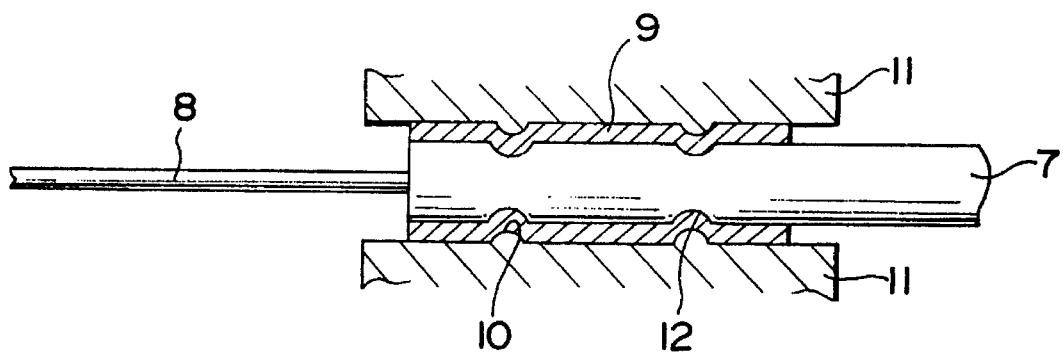
FIG. 3 is a schematic diagram showing a crimping step in the assembling process for the aforesaid embodiment.

FIG. 1 is the diagram showing an embodiment of the optical fiber assembly according to the present invention, a part of the assembly being cut away; FIG. 2 is the schematic diagram showing the components used for the embodiment; and FIG. 3 is the schematic diagram showing the crimping step for assembling the embodiment.

FIG. 2 shows the components of the optical fiber connector plug which is the embodiment of the optical fiber assembly in accordance with the invention.

A protective sheath 7 at the distal end of the optical fiber is removed to expose an optical fiber 8. A thin-wall metal pipe 9 made of stainless steel is placed over the distal end of the protective sheath 7. The metal pipe 9 is crimped by a crimping tool 11 so as to increase the crimping stress of the metal pipe 9 and the protective sheath 7. FIG. 3 shows the metal pipe 9, the shape of which has been altered in the crimping step in the assembling process of the embodiment.

The crimping tool 11, which is provided with a plurality of projections 10, is used to form a plurality of indentations 12 in the surface of the metal pipe 9, so that the corresponding projections on the internal surface are let bite into the outer peripheral surface of the protective sheath 7.

As shown in FIG. 1, the optical fiber 8 is inserted in a through hole 14 provided at the center of a ferrule 13 and fixed with an epoxy resin adhesive agent.

The metal pipe 9 is inserted in a stepped hole 15 of a metal supporting sleeve 4 and the epoxy resin adhesive agent is charged, then the assembly of the aforesaid optical fiber and the metal pipe 9 is inserted and glued. Lastly, an end surface 16 of the ferrule 13 and the distal end of the optical fiber are polished for finishing.

The second embodiment and the manufacturing method for the same will now be described.

Figure 4:
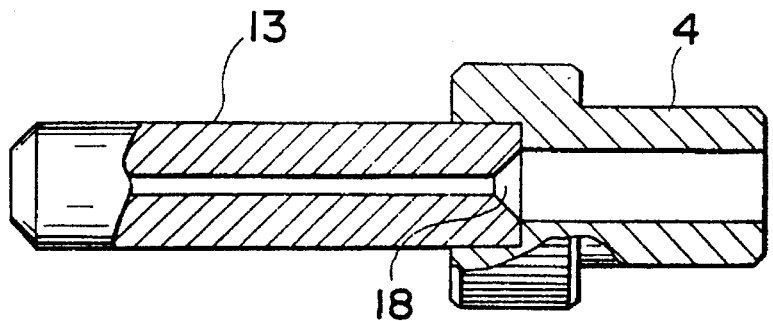
FIG. 4 is a cross-sectional view showing a ferrule which has been press-fitted and fixed in the metal supporting sleeve in the manufacturing process for a second embodiment.
Figure 5:
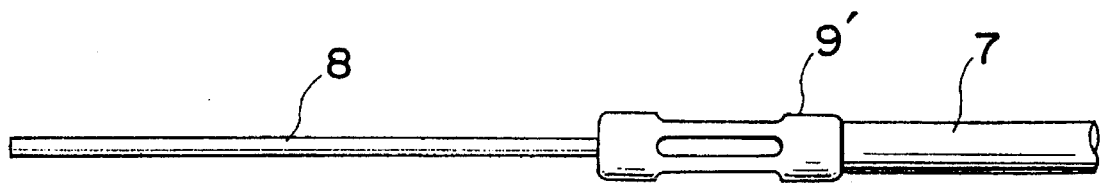
FIG. 5 is a diagram showing a metal pipe which has been connected to the optical fiber in the manufacturing process for the second embodiment.
Figure 6:
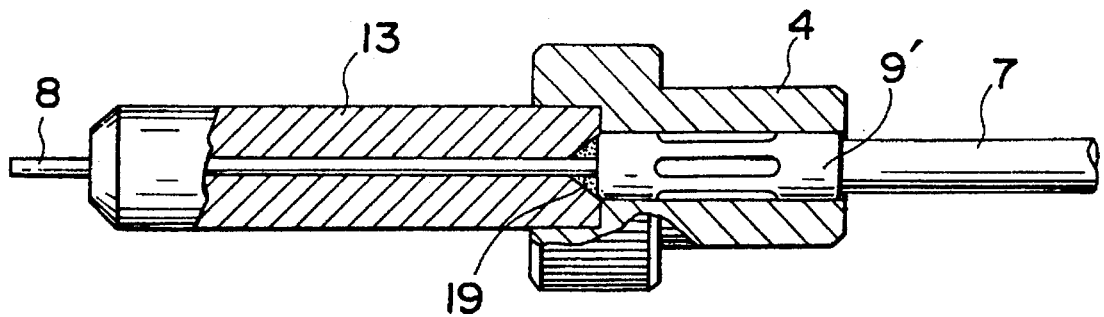
FIG. 6 is a cross-sectional view showing a state wherein the optical fiber and the metal pipe, which are shown in FIG. 5, have been inserted into the ferrule and the metal supporting sleeve in the manufacturing process for the second embodiment.
Figure 7:
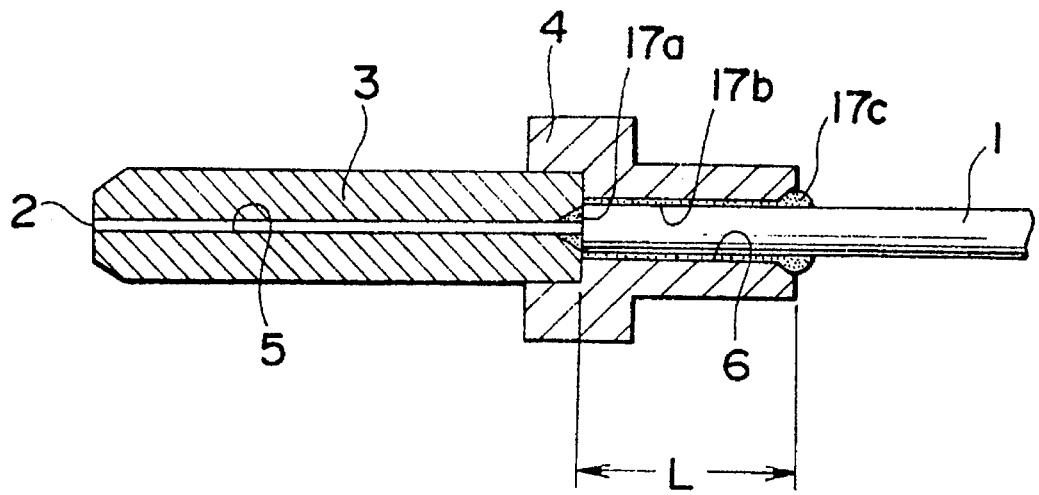
FIG. 7 is a cross-sectional view showing a conventional optical fiber connector plug.
Figure 8:
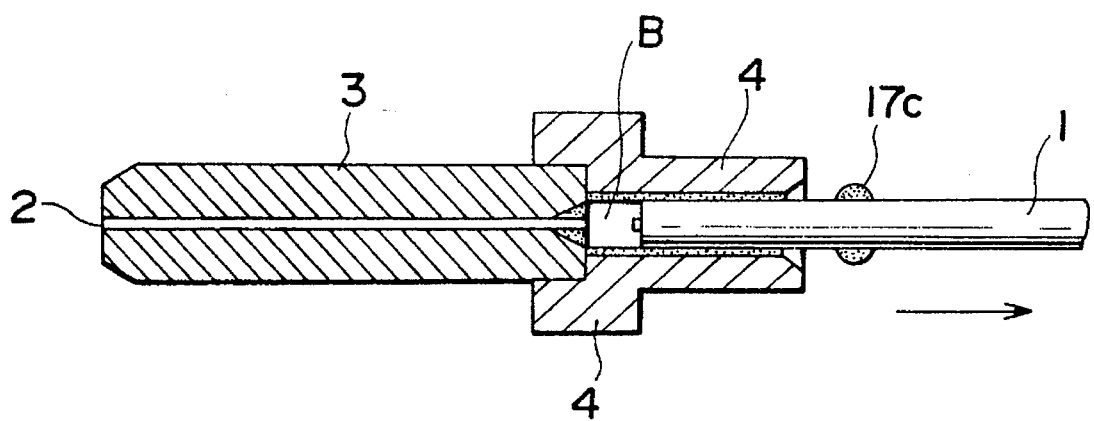
FIG. 8 is a cross-sectional view illustrative of the optical fiber connector plug which has been broken during a heating cycle test.

FIG. 4 is the cross-sectional view showing the ferrule 13 which has been press-fitted and fixed in the metal supporting sleeve 4; FIG. 5 is the diagram showing a metal pipe 9' which has been connected to the optical fiber; and FIG. 6 is the cross-sectional view showing the state wherein the optical fiber and the metal pipe 9', which are shown in FIG. 5, have been inserted into the ferrule 13 and the metal supporting sleeve 4. The basic structures of the parts are almost the same as those of the embodiment described above, except that the metal pipe 9' is crimped at four grooves in the outer periphery thereof.

The following describes the manufacturing method for the second embodiment.

First, the ferrule 13 is press-fitted and fixed in the metal supporting sleeve 4 as shown in FIG. 4. Then, the distal end of the optical fiber which has a secondary sheath is inserted in the thin-wall metal pipe 9' so that the part which is longer than the ferrule 13 penetrates the pipe 9'. For this embodiment, a single-mode optical fiber was used for the optical fiber; the diameter of the optical fiber was 125 µm; and the diameter of the optical fiber sheath was 0.9 mm.

The metal pipe 9' is crimped so that it is deformed at four places which are symmetrical to the optical axis of the optical fiber and the projections on the internal wall of the metal pipe 9' bite into the secondary sheath 7 of the optical fiber, thereby combining the metal pipe 9' and the optical fiber into one piece.

In order to control the damping factor caused by the pressure applied to the optical fiber to 0.05 db/1300 nm or less, the crimping pressure should be controlled to 200 to 400 g/mm or less.

The crimping combines the metal pipe and the secondary sheath into one piece. The secondary sheath applies pressure to the optical fiber. After the crimping, the optical fiber should stay at the center. A crimping structure which is axially symmetrical like this embodiment is preferable.

As shown in FIG. 5, the portions of the secondary sheath 7 and the primary sheath which extend beyond the metal pipe 9' are removed and the exposed portions are immersed in a solvent to clean them. A thermosetting epoxy adhesive agent (EPOTECH 353ND which is a trade name of Epoxy Technology in the United States) 19 is dropped using a syringe needle into an indentation 18 in the base of the ferrule 13 which has been press-fitted and fixed in the supporting sleeve 4 with a flange shown in FIG. 4 until the indentation is flooded.

The glass transition temperature (Tg) of the adhesive agent 19 is 124° C. The aforesaid optical fiber 8 is inserted in the ferrule 13 from the side of the adhesive agent 19 until one end of the crimped metal pipe 9' reaches the ferrule 13. This insertion causes the adhesive agent 19 to run into the ferrule and around the outer periphery of the metal pipe 9'; therefore, when the assembly is heated, the viscosity of the adhesive agent 19 decreases and the adhesive agent 19 spreads, due to the capillary phenomenon, around the optical fiber 8 in the ferrule 13 and between the metal pipe 9' and the supporting sleeve 4, and also between the secondary sheath 7 of the optical fiber and the metal pipe 9'. The heating is performed for a few minutes to ten plus minutes at a temperature which is not higher than the aforesaid glass transition temperature. For example, the adhesive agent 19 hardens when it is heated at 120° C. for five minutes. Lastly, the end surface of the ferrule 13 is polished for finishing.

The present invention may be embodied in other forms without departing from the spirit or essential characteristics thereof. The embodiments described above are therefore to be considered in all respects as illustrative and not restrictive.

As an example of the optical fiber assembly, a single optical fiber connector plug has been shown. The invention, however, may also be employed for the optical fiber assemblies of optical structure components including a plurality of plugs for simultaneous connection, optical fiber attenuators, and branch merging devices.

Thus, according to the embodiment wherein the optical fiber assembly in accordance with the present invention is applied to the optical fiber connector plug, although the metal pipe 9 attempts to shift in the axial direction because of the change in the physical property due to the change in the temperature of the protective sheath 7, the problem attributable to that can be solved.

In the first embodiment described above, no problem of the protective sheath 7 slipping out or the optical fiber 8 breaking was observed even after the severe heating cycle test of 100 cycles or more was conducted under the conditions stated above. The optical fiber connector plug of the second embodiment also exhibited nearly the same durability and no problem of the protective sheath 7 slipping out or the optical fiber 8 breaking was observed.

The manufacturing method for optical fiber assemblies in accordance with the present invention allows an optical fiber and a sheath to be fixed at the same time in a single heating step, achieving an extremely simplified manufacturing process.

What is claimed is:

1. An optical fiber assembly comprising:

an optical fiber having a protective sheath at a distal end thereof, said optical fiber projecting from said sheath;

a pipe surrounding said protective sheath adjacent the distal end of said optical fiber, said pipe being secured to said sheath by crimping;

a ferrule surrounding the distal end of said optical fiber;

a supporting sleeve having a stepped portion at one end thereof for receiving an end of said ferrule, said supporting sleeve surrounding said pipe and said ferrule; and a thermosetting resin for adhering said optical fiber and said pipe to said ferrule and said supporting sleeve.

2. The optical fiber assembly according to claim 1, wherein said sheath is butted against said ferrule.

3. The optical fiber assembly according to claim 1, wherein said ferrule is made of a ceramic material, and said supporting sleeve is made of metal.

4. An optical fiber assembly comprising:

an optical fiber having a protective sheath at a distal end thereof, said optical fiber projecting from said sheath;

a pipe having a plurality of symmetrically located deformed portions extending along an axis thereof, said pipe surrounding said protective sheath adjacent the distal end of said optical fiber and being secured to said sheath by being symmetrically crimped at said deformed portions;

a ferrule surrounding the distal end of said optical fiber;

a supporting sleeve having a stepped portion at one end thereof for receiving an end of said ferrule, said supporting sleeve surrounding said pipe and said ferrule; and a thermosetting resin for adhering said optical fiber and said pipe to said ferrule and said supporting sleeve.

5. A method of manufacturing an optical fiber assembly including a ferrule, a supporting sleeve, an optical fiber having a protective sheath at a distal end thereof, and a metal pipe, said method comprising the steps of:

inserting an end of the ferrule into an end of the supporting sleeve;

exposing a portion of said optical fiber so that it projects from said sheath;

inserting the distal end of the optical fiber into the metal pipe whereby the pipe surrounds the protective sheath;

deforming the metal pipe by crimping thereby securing it to the sheath, projections on an internal wall of the pipe resulting from said deformation biting into the sheath;

applying a thermosetting adhesive agent to the ferrule;

inserting the exposed portion of the optical fiber into an opening in the ferrule and the metal pipe into the supporting sleeve; and heating the resulting assembly thereby fixing with the adhesive agent the optical fiber to the ferrule and the metal pipe to the supporting sleeve.

6. The method according to claim 5, wherein said crimping exerts a pressure between 200 to 400 grams per millimeter.

* * * * *